US009460466B2

(12) United States Patent
Vassilvitskii et al.

(10) Patent No.: US 9,460,466 B2
(45) Date of Patent: Oct. 4, 2016

(54) LIMITING BID SELECTION TO ELIGIBLE CONTENT ITEMS

(71) Applicant: Google Inc., Mountain View, CA (US)

(72) Inventors: Sergei Vassilvitskii, San Francisco, CA (US); Andrei Z. Broder, Palo Alto, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/598,108

(22) Filed: Jan. 15, 2015

(65) Prior Publication Data

US 2015/0317724 A1 Nov. 5, 2015

(30) Foreign Application Priority Data

May 4, 2014 (IL) .......................................... 232433

(51) Int. Cl.
*G06K 5/00* (2006.01)
*G06Q 30/08* (2012.01)

(52) U.S. Cl.
CPC .................................... *G06Q 30/08* (2013.01)

(58) Field of Classification Search
USPC ........... 235/383, 380; 705/14.71, 14.72, 26.4
See application file for complete search history.

(56) References Cited

U.S. PATENT DOCUMENTS 8,135,626 B2 3/2012 Das et al.
8,589,234 B1 * 11/2013 Lee .................... G06Q 30/0275 705/14.43
2010/0228597 A1 9/2010 Das et al.
2010/0228634 A1 9/2010 Ghosh et al.
2010/0228635 A1 9/2010 Baker et al.
2010/0228637 A1 9/2010 Ghosh et al.
2010/0228641 A1 9/2010 Das et al.
2010/0228642 A1 9/2010 Baker et al.
2015/0006312 A1 * 1/2015 Murray .................. G06Q 50/01 705/26.3
2015/0221023 A1 * 8/2015 Numazu ................ G06Q 30/08 705/26.3
2015/0317697 A1 * 11/2015 Samet ................ G06Q 30/0275 705/14.43

FOREIGN PATENT DOCUMENTS

WO 2010/101716 9/2010

* cited by examiner

*Primary Examiner* — Ahshik Kim
(74) *Attorney, Agent, or Firm* — Fish & Richardson P.C.

(57) ABSTRACT

Methods, systems, and apparatus include computer programs encoded on a computer-readable storage medium, including a method for providing content. A request is received for content to be displayed on a resource to a user. The user is identified. Candidate content items are identified from an inventory of content items that are responsive to the request. The candidate content items are evaluated including determining bid-eligible content items including content items that satisfy an eligibility threshold based on an eligibility status associated with a respective candidate content item. The eligibility status is based at least in part on results associated with past opportunities to present a content item to identified user. An auction is conducted to identify a winner from among the bid-eligible content items. The winning content item is provided responsive to the request. An eligibility status is updated for losing and winning content items in the auction.

19 Claims, 4 Drawing Sheets

LIMITING BID SELECTION TO ELIGIBLE CONTENT ITEMS

CROSS-REFERENCE TO RELATED APPLICATION

This application is based upon and claims benefit of priority of the prior Israel Patent Application No. 232433, filed on May 4, 2014. The disclosure of the foregoing application is hereby incorporated by reference in its entirety.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes receiving a request for content to be displayed on a resource to a user. The method further includes identifying the user. The method further includes identifying candidate content items from an inventory of content items that are responsive to the request. The method further includes evaluating the candidate content items including determining bid-eligible content items including content items that satisfy an eligibility threshold based on an eligibility status associated with a respective candidate content item, the eligibility status based at least in part on results associated with one or more past opportunities to present a content item to the identified user. The method further includes conducting an auction to identify a winner from among the bid-eligible content items. The method further includes providing the winning content item responsive to the request. The method further includes updating an eligibility status for each of losing content items and the winning content item in the auction.

These and other implementations can each optionally include one or more of the following features. The eligibility status can be based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item. The eligibility status can be based on a rate of success in auctions for a respective content item or sponsor associated with a respective content item, and updating can include updating a rate for a respective losing content item or sponsor. associated with a losing content item. Updating can further include updating either a count associated with prior losses in auctions or an eligibility status associated with each losing content item. Updating can further include declaring one or more of the losing content items as ineligible for a future auction based on an eligibility function. The method can further include applying a probability function to determine eligibility for each losing content item and setting eligibility for each individual losing content item based on the applying. The eligibility threshold can be associated with a predetermined rate of winning auctions. The method can further include storing eligibility information for each content item in the inventory for each user. The method can further include storing auction results information in a log including identifying information for losing bids and user identifiers associated with received requests for content related to a given auction. The method can further include determining which of the losing content items should be declared ineligible for a next opportunity to present content to the user and updating a status associated with a declared ineligible content item. Determining which of the losing content items should be declared ineligible can include using an eligibility function to declare an individual content item either eligible or ineligible. The method can further include soliciting a real-time bid from a content sponsor for presentation of a content item responsive to the request and declaring the bid ineligible based at least in part on the eligibility status. Identifying the user can be based on a cookie, a device identifier or a login operation. The method can further include notifying a content sponsor when a content item is declared ineligible for a future auction.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a request for content to be displayed on a resource to a user; identify the user; identify candidate content items from an inventory of content items that are responsive to the request; evaluate the candidate content items including determining bid-eligible content items including content items that satisfy an eligibility threshold based on an eligibility status associated with a respective candidate content item, the eligibility status based at least in part on results associated with one or more past opportunities to present a content item to the identified user; conduct an auction to identify a winner from among the bid-eligible content items; provide the winning content item responsive to the request; and update an eligibility status for each of losing content items and the winning content item in the auction.

These and other implementations can each optionally include one or more of the following features. The eligibility status can be based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item. The eligibility status can be based on a rate of success in auctions for a respective content item or sponsor associated with a respective content item, and wherein updating includes updating a rate for a respective losing content item or sponsor.

In general, another innovative aspect of the subject matter described in this specification can be implemented in systems, including a system comprising one or more processors and one or more memory elements including instructions. The instructions, when executed, cause the one or more processors to: receive a request for content to be displayed on a resource to a user; identify the user; identify candidate content items from an inventory of content items that are responsive to the request; evaluate the candidate content items including determining bid-eligible content items including content items that satisfy an eligibility threshold based on an eligibility status associated with a respective candidate content item, the eligibility status based at least in part on results associated with one or more past opportunities to present a content item to the identified user; conduct an auction to identify a winner from among the bid-eligible content items; provide the winning content item responsive to the request; and update an eligibility status for each of losing content items and the winning content item in the auction.

These and other implementations can each optionally include one or more of the following features. The eligibility status can be based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item. The eligibility status can be based on a rate of success in auctions for a respective content item or sponsor associated with a respective content item, and wherein updating includes updating a rate for a respective losing content item or sponsor.

Particular implementations may realize none, one or more of the following advantages. Making bids ineligible for a given presentation opportunity or for a prescribed amount of time (e.g., based on a poor track record of performance) can provide an incentive for content sponsors to provide higher bids. Revenues resulting from winning bids can increase when bid-ineligible content items (e.g., that may have low-ball bids) are prevented from entering auctions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for limiting bid selection to eligible content items, where eligibility may depend on prior performance. For example, for a candidate content item to be eligible for inclusion in an auction (e.g., to select a winning content item in response to a request), the candidate content item may be required to have a predetermined eligibility status that exceeds a pre-determined eligibility threshold. In some implementations, determining whether the eligibility status exceeds the eligibility threshold can include determining if a number of losing bids (e.g., in previous auctions) for the candidate content item associated with presentation opportunities to a particular user (e.g., identified by a cookie) exceeds a maximum number of losing bids (e.g., within a time period). If the candidate content item is determined to be bid-eligible (e.g., does not have previous bids exceeding the maximum), then the candidate content item can enter the auction with other bid-eligible content items. Depending on which content item wins the auction, the eligibility status for the winning and losing content items can be updated, which can affect future bid eligibility. Other ways of determining and using bid-eligibility are possible.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Figure 1:
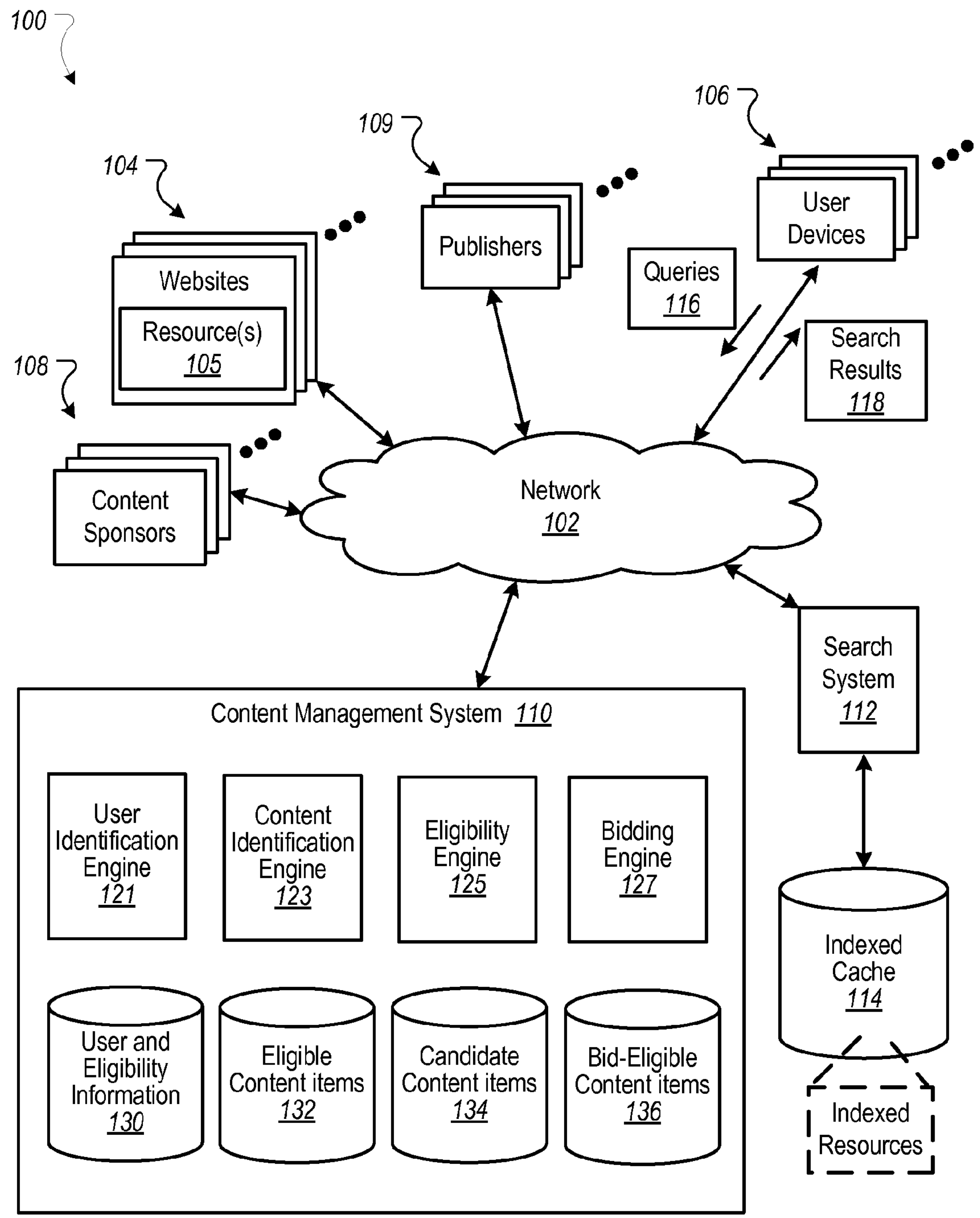
FIG. 1 is a block diagram of an example environment for providing content.

FIG. 1 is a block diagram of an example environment 100 for providing content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. Further, some data stores described herein may include identifiers that can be used to match or access corresponding data records or other information that are stored elsewhere, e.g. locally and/or remotely. Examples of other information can include bid history information, content item performance information, and sponsor performance information to name a few.

A data store of user and eligibility information 130, for example, can include eligibility status information, for example, on a per-content-item, per-user, or per-sponsor basis. For example, the eligibility status information for a content item can identify (or be based on) a number of unsuccessful auction bids that have occurred for presentation opportunities of the content item to a particular user or to a class of users, e.g., as identified using an anonymous cookie. Other eligibility status information can also be stored and used.

A data store of eligible content items 132, for example, can include eligible content items (e.g., advertisements) that can be selected in response to a received request for content. For example, eligible content items may be deemed to be eligible, at least in part, by matching keywords and/or other selection information. The data store of eligible content items 132 can include, for example, an inventory of content items (e.g., creatives) provided by content sponsors 108 for presentation to users.

A data store of candidate content items 134, for example, can include particular ones of eligible content items that are identified as candidates to be provided for a particular request for content. For example, the candidate content items 134 can be determined in real-time, based on a received request, and can include content items that are candidates for entering an auction, depending on their eligibility status.

A data store of bid-eligible content items 136, for example, can include content items that have an eligibility status that satisfies an eligibility threshold, e.g., making a respective content item eligible for bidding in an auction for a presentation opportunity of the content item to a particular user. For example, for a candidate content item to be determined (e.g., in real time) as being bid-eligible, the number of losing bids for presentation opportunities of the content item to the particular user or particular type of user may not exceed a predetermined threshold number of bids (e.g., in a given time period). In some implementations, the number of losing bids can be associated with any user, and as such, represents a metric associated with either a particular campaign or content sponsor.

In some implementations, some of the data stores 130-136 can be combined, e.g., for efficiency. For example, candidate content items 134 that are determined to be bid-eligible can be flagged or indicated as bid-eligible in some other way. Other data stores are possible. In some implementations, bid eligible content items are not stored per se, and rather, are identified from the available inventory, qualified for inclusion in the auction, and then selected depending on the results of the auction without ever storing them separately in a data store.

The content management system 110 can include plural engines, some or all of which may be combined or separate, and may be co-located or distributed (e.g., connected over the network 102). A user identification engine 121, for example, can identify a user associated with a particular request for content. For example, the identification can include determining a user identify for matching information in the user and eligibility information 130, using an anonymous cookie for the user or some other user identifier.

A content identification engine 123, for example, can identify candidate content items from an inventory of eligible content items that are responsive to a received request for content. For example, the content identification engine 123 can identify candidate content items 134 using the eligible content items 132, the identification performed, at least in part, by matching keywords or other information in the request for content.

An eligibility engine 125, for example, can evaluate candidate content items 134 to determine bid-eligible content items 136. For example, determining bid-eligible content items can include identifying content items that satisfy an eligibility threshold based on an eligibility status associated with a respective candidate content item. In some implementations, the eligibility status can be based, at least in part, on results associated with one or more past opportunities to present a content item to the identified user.

A bidding engine 127, for example, can conduct an auction to identify a winner from among the bid-eligible content items 136. For example, the bidding can exclude any respective content item that has an eligibility status that exceeds (or otherwise does not meet) the eligibility threshold, e.g., cookies that have been bid on too many times (e.g., recently).

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource.

Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In addition, when no search is performed or no keywords are available (e.g., because the user is not browsing a webpage), other information, such as information obtained from one or more snapshots, can be used to respond to the received request. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
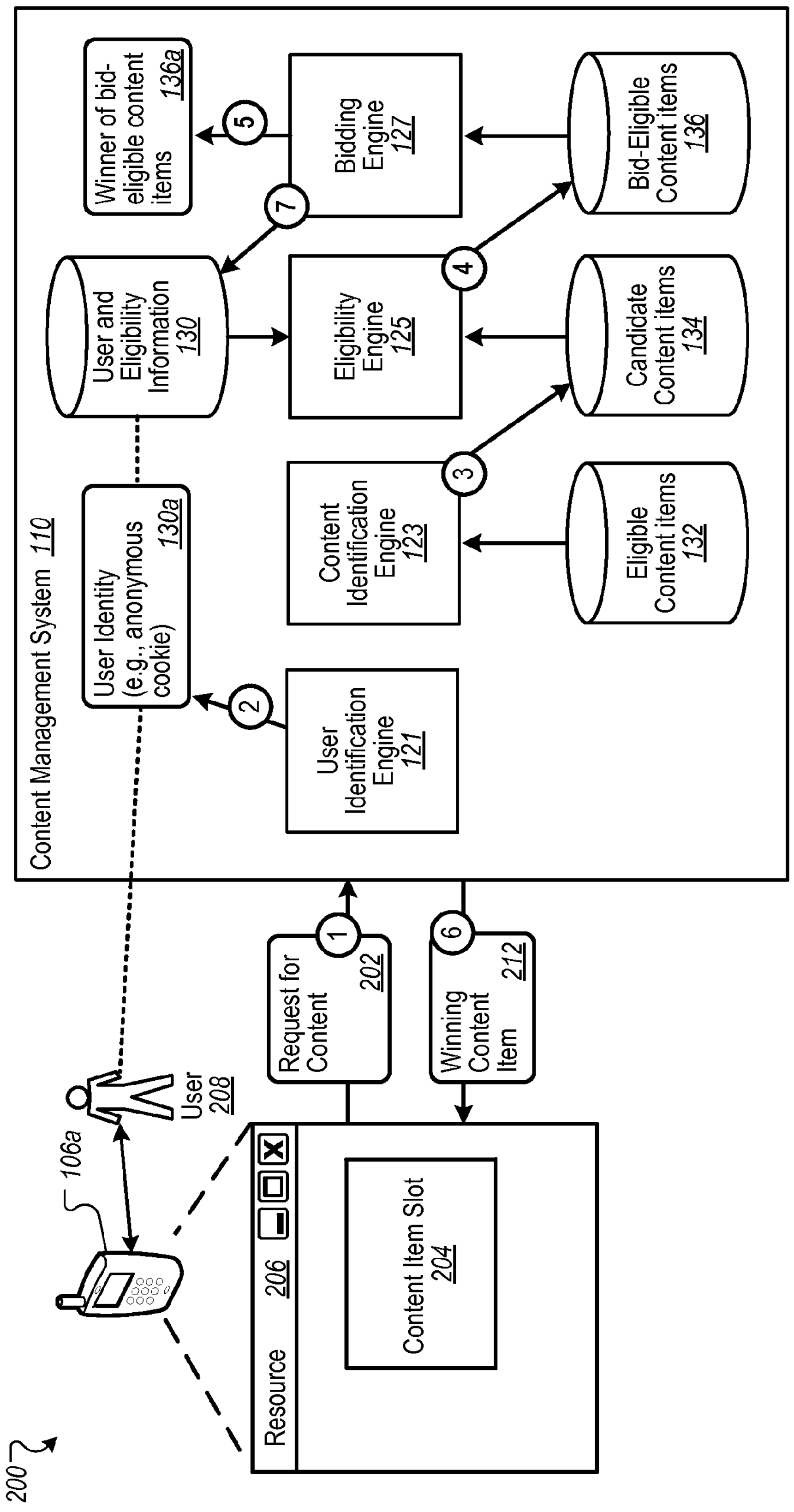
FIG. 2 shows an example system for limiting bid selection to eligible content items.

FIG. 2 shows an example system 200 for limiting bid selection to eligible content items. For example, when a request for content 202 is received, the content management system 110 can limit bids, in an auction, to content items responsive to the request and for which there have not been an excessive (e.g., above a predetermined threshold) number of losing bids recently. For example, a particular content item can be ineligible to be included in the auction if the content item has lost too many recent bids in opportunities to present content to a particular user, e.g., identified by a cookie. In some implementations, limiting bid selection to eligible content items by the system 200 can occur in the following example sequence of stages.

At stage 1, for example, the content management system 110 can receive a request for content 202 for content to be displayed on a resource to a user. For example, the request for content 202 can be sent from a user device **106*a*, such as to fill a content item slot 204 (e.g., an ad slot) on a resource 206 being viewed by a user 208**.

At stage 2, for example, the user identification engine 121 can identify the user (e.g., user 208) associated with the request for content 202. The identified user, for example, can match information (e.g., a specific user) in the user and eligibility information 130, such as to identify a user identity **130*a* (e.g., a cookie associated with the user 208). In some implementations, identification of the user can be based on an anonymous cookie that is received with the request for content 202**.

At stage 3, for example, the content identification engine 123 can identify candidate content items 134 from the inventory of eligible content items 132 that are responsive to the request for content 202. For example, the candidate content items 134 that are identified from the eligible content items 132 can be identified, at least in part, by matching keywords or other information in the request for content 202, as described above with reference to FIG. 1.

At stage 4, for example, the eligibility engine 125 can evaluate the candidate content items 134, including determining bid-eligible content items 136. For example, the bid-eligible content items 136 that are determined can include content items that satisfy an eligibility threshold based on an eligibility status associated with a respective candidate content item. The eligibility status can be based, at least in part, on results associated with one or more past opportunities to present a content item, such as to the identified user. For example, for each candidate content item 134, the eligibility engine 125 can access eligibility status information for that particular content item or content item sponsor in association with past bids on content presentation to the user identify **130*a* or to users in a similar category or to users in general, depending on the eligibility criteria being used. When too many bids have occurred (and/or some other eligibility threshold) for that content item for the cookie associated with the user 208**, the content item may be labeled as bid ineligible. Similarly, the label may be applied to the content sponsor depending on the nature of the criteria in use. In some implementations, the label may be applied for the single impression (i.e., only associated with the single current request). Alternatively, the label may be applied for a predetermined amount of time to the content item or the sponsor, again, depending on the criteria being used.

At stage 5, for example, the bidding engine 127 can conduct an auction to identify a winner 136*a* from among the bid-eligible content items 136. For example, the bidding that occurs at this stage is described above with respect to FIG. 1. However, in this example, the bidding excludes content items that have an eligibility status that exceeds the eligibility threshold, e.g., cookies that have been bid on too many times (e.g., recently).

At stage 6, for example, the content management system 110 can provide the winning content item 212 responsive to the request. For example, the winning content item 212 that is provided can be the winner 136*a* that is identified by the bidding engine 127.

At stage 7, for example, the bidding engine 127 can update an eligibility status for each of the losing content items (and/or sponsors) and the winning content item (and/or sponsor) in the auction. For example, the bidding engine 127 can indicate that the winner 136*a* has won an auction and that the remaining bid-eligible content items 136 have lost the auction.

Figure 3:
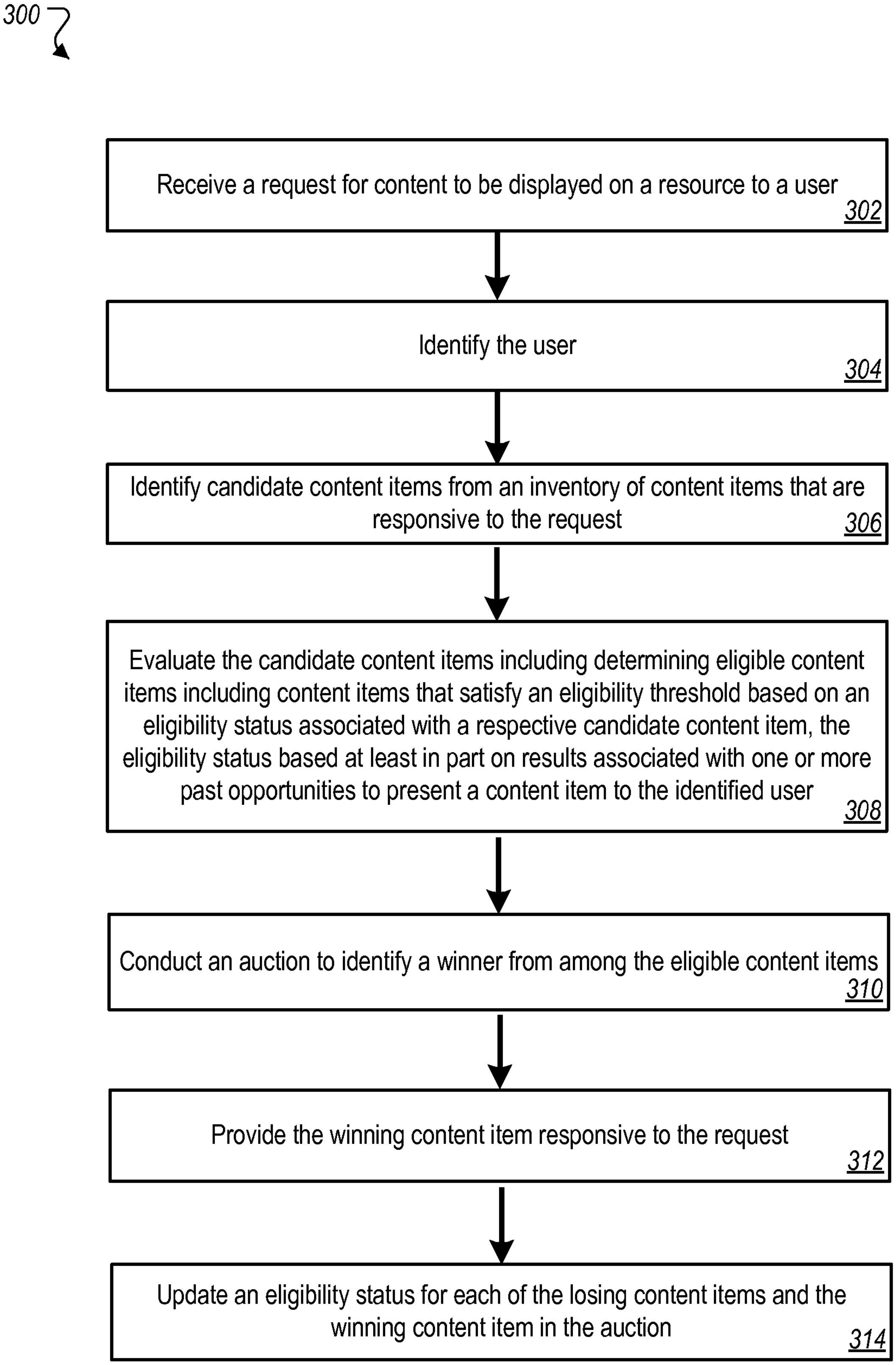
FIG. 3 is a flowchart of an example process for limiting bid selection to eligible content items.

FIG. 3 is a flowchart of an example process 300 for limiting auction entry to bid eligible content items. In some implementations, the content management system 110 can perform steps of the process 300 using instructions that are executed by one or more processors. FIGS. 1-2 are used to provide example structures for performing the steps of the process 300.

A request for content is received for content that to be displayed on a resource to a user (302). As an example, the content management system 110 can receive the request for content 202 that is sent from the user device 106*a*, e.g., to fill the content item slot 204 on the resource 206.

The user is identified (304). The user identification engine 121, for example, can identify the user 208 associated with the request for content 202, such as to identify the user identity 130*a*. The identified user, for example, can match information for the specific user 208 in the user and eligibility information 130. In some implementations, the specific user is identified. In some implementations, a user's class is identified. Either or both can be used when determining bid eligibility.

In some implementations, identifying the user can be based on a cookie, a device identifier or a login operation. For example, the user identification engine 121 can identify the user based on user-identifying information included in the request for content 202, such as a cookie (e.g., browser cookie), a device identifier (e.g., that uniquely identifies the user device 106*a*), or user login identifier used by the user 208 to log in through a user login service.

Candidate content items are identified from an inventory of content items that are responsive to the request (306). For example, the content identification engine 123 can identify candidate content items 134 from the inventory of eligible content items 132 that are responsive to the request for content 202. Identification can be based, at least in part, on matching keywords and/or other selection criteria included in or associated with the request for content 202.

The candidate content items are evaluated including determining bid-eligible content items, including content items that satisfy an eligibility threshold based on an eligibility status associated with a respective candidate content item (308). The eligibility status is based at least in part on results associated with one or more past opportunities to present a content item, e.g., to the identified user. The eligibility engine 125, for example, can evaluate the candidate content items 134 including determining bid-eligible content items 136. For example, the bid-eligible content items 136 can include content items that satisfy an eligibility threshold based on an eligibility status associated with the respective candidate content item. In some implementations, the eligibility threshold can be associated with a predetermined rate of winning auctions. For example, a rate of 5% of auction wins or higher can be considered a winning rate, and content items with lower win rates can be marked as being ineligible.

In some implementations, the eligibility status can be based on a previous number of prior losses in auctions in which a specific content item participated or any content items from an associated content sponsor participated. Evaluating, for example, can include evaluating a respective count in comparison to the eligibility threshold, and updating the eligibility status can include updating the count for a respective losing content item. For example, the eligibility engine 125 can determine that a particular one of the candidate content items 134 is ineligible because that particular candidate content item 134 has had too many losing bids (e.g., lately) or content items in general that are associated with the same content sponsor 108 have had too many losing bids (e.g., lately). Other ways of determining ineligibility are possible, including ineligibility functions that consider both of a bid-loss count for a particular content item and bid-loss counts for content items of the same content sponsor, or other ineligibility functions. As a result of any auction, the ineligibility status for a losing content item can be updated and also associated with a count for content items for the same content sponsor, e.g., for a given time period.

In some implementations, the eligibility status can be based on a rate of success in auctions for a respective content item or sponsor associated with a respective content item, and updating the eligibility status include updating a rate for a respective losing content item or a particular sponsor associated with a losing content item. As an example, the eligibility engine 125 can determine a win percentage rate or some other measure beyond a simple count of losing bids. Rates can be for both or either of a particular content item or for a content sponsor associated with the particular content item.

An auction is conducted to identify a winner from among the bid-eligible content items (310). As an example, the bidding engine 127 can conduct an auction to identify the winner 136*a* from among the bid-eligible content items 136.

The winning content item is provided responsive to the request (312). For example, the content management system 110 can provide the winning content item 212 responsive to the request for content 202. The winning content item 212, for example, can be the winner 136*a* that is identified by the bidding engine 127.

An eligibility status for each of losing content items and the winning content item is updated in the auction (314). The bidding engine 127, for example, can update the eligibility status for the winning content item (e.g., winner 136*a*) and the losing content items (e.g., the remaining bid-eligible content items 136 that have lost the auction).

In some implementations, the process 300 can further include storing eligibility information for each content item, campaign and/or content sponsor in the inventory. For example, the bidding engine 127 can store the eligibility status information for a content item and a content sponsor in the user and eligibility information 130.

In some implementations, updating the eligibility status can further include updating either a count associated with prior losses in auctions or an eligibility status associated with each losing content item. For example, for each of the bid-eligible content items 136 that did not win the auction, the bidding engine 127 can update the user and eligibility information 130. The update can include, for example, updating the count of losing bids (and optionally including a date/time of the losing bid).

In some implementations, updating the eligibility status can further include declaring one or more of the losing content items as ineligible for a future auction based on an eligibility function. For example, for some losing content items (e.g., with a certain number of losses), the bidding engine 127 can update the user and eligibility information 130, e.g., updating the status of the content item set to ineligible.

In some implementations, the process 300 can further include applying a probability function to determine eligibility for each losing content item and setting eligibility for each individual losing content item based on the applying. For example, the bidding engine 127 can use predetermined probability functions based on historical information to determine when a particular number of losing bids is indicative of an inability to win an auction and/or that the content item should not be included in future auctions. In some implementations, some content items can have their status set to ineligible. In some implementations, information associated with losing bids can be purged for losing bids having a particular age (e.g., a week), such as if it is determined that these older losing bids are not to be used to determine ineligibility.

In some implementations, the process 300 can further include storing auction results information in a log, including identifying information for losing bids and user identifiers associated with received requests for content related to a given auction. For example, the content management system 110 (e.g., the bidding engine 127) can store the results of any bid in a log for subsequent use by the eligibility engine 125 in determining the eligibility of a candidate content item 134. The log can include, for example, identifiers for the losing content items and identifiers (e.g., cookies) for the users associated with the received requests for content. In some implementations, the log can also include date/time information that can be used to determine eligibility based on time (e.g., a number or percentage of losing bids in a time period of length T).

In some implementations, the process 300 can further include determining which of the losing content items should be declared ineligible for a next opportunity to present content to the user and updating a status associated with a declared ineligible content item. For example, the eligibility engine 125 can assign a status of "ineligible" to certain ones of the losing bid-eligible content items 136 when, for example, a particular content item has reached a predetermined number or percentage of losing bids. Subsequently, the eligibility engine 125 can automatically exclude these identified content items from the candidate content items 134.

In some implementations, determining which of the losing content items should be declared ineligible can include using an eligibility function to declare an individual content item as either eligible or ineligible. For example, the eligibility engine 125 can use a function (e.g., a weighted function) that determines a content item's eligibility or ineligibility status based on one or more of a number of losing bids or a percentage of losing bids for that content item, a number or percentage of losing bids for the associated content sponsor, and/or other factors that can also include or reflect a time element.

In some implementations, the process 300 can further include soliciting a real-time bid from a content sponsor for presentation of a content item responsive to the request. The real time bid may be solicited when a conventional bid has been declared ineligible. Depending on the size of the real time bid, the real time bid may too be declared bid ineligible based at least in part on the eligibility status. For example, for a bid received in real time from a content sponsor 108 (e.g., in response to the request for content 202), the content management system 110 can use status eligibility information in the user and eligibility information 130 for either or both of the content item or the content sponsor 108 to declare the bid ineligible. Further, once a conventional bid is declared ineligible, a real time bid may have to clear a different higher threshold in order to qualify for a given auction.

In some implementations, the process 300 can further include notifying a content sponsor when a content item is declared ineligible for the present or a future auction. For example, for each of the particular ones of the candidate content items 134 that the eligibility engine 125 does not identify as bid-eligible, the content sponsor 108 associated with that content item can be notified (e.g., by the content management system 110), e.g., with information that identifies the reason(s) that the content sponsor's content item is ineligible. As a result, the content sponsor 108 can use the information, for example, to change bid amounts or other content selection criteria for the corresponding content item.

Figure 4:
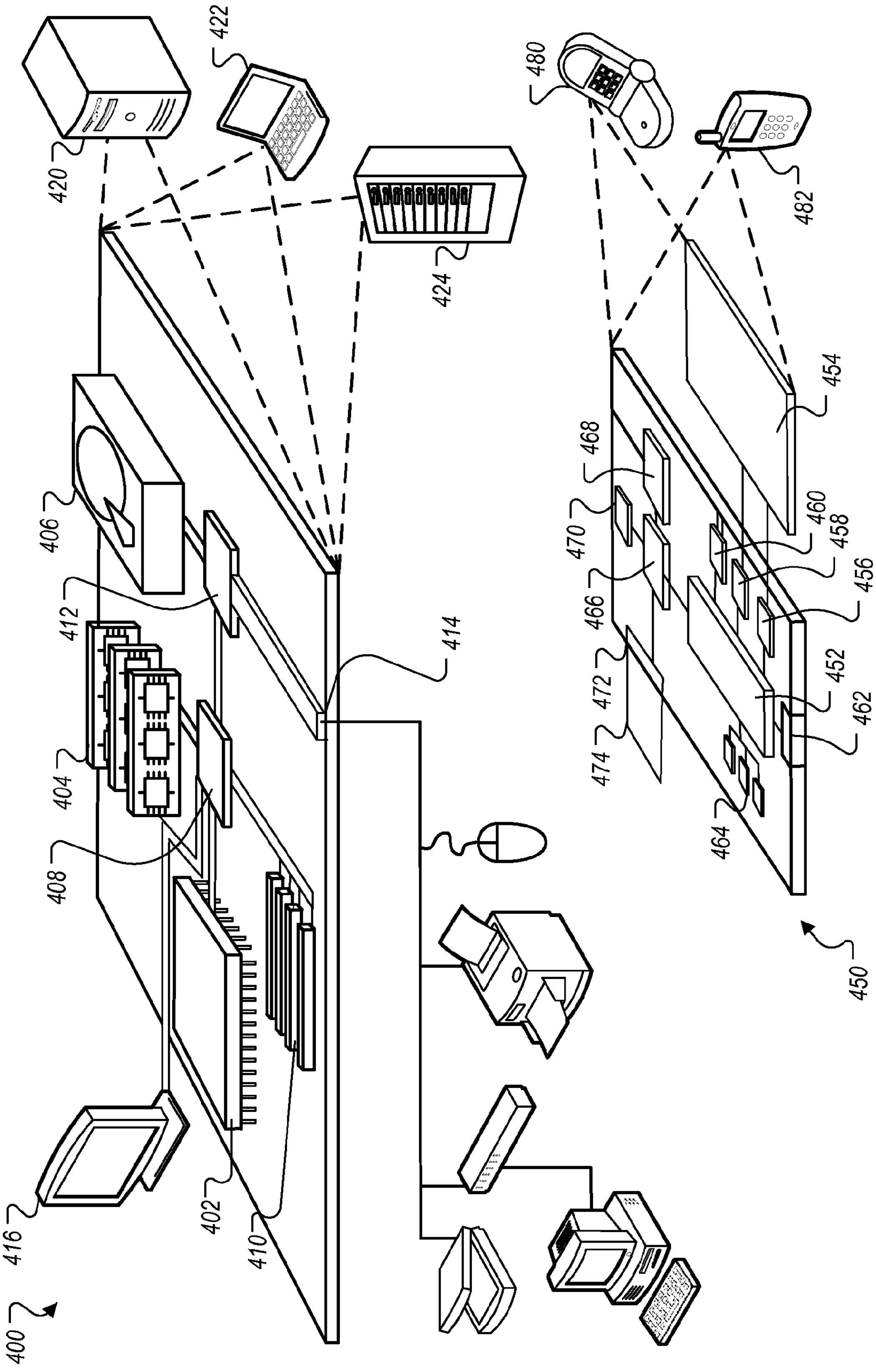
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

receiving a request for content to be displayed on a resource to a user;

identifying the user;

identifying candidate content items from an inventory of content items that are responsive to the request;

evaluating, by one or more processors, the candidate content items including determining bid-eligible content items including content items that satisfy an eligibility threshold based on an eligibility status associated with a respective candidate content item, the eligibility status based at least in part on results associated with one or more past opportunities to present a content item to the identified user;

conducting, by one or more processors, an auction to identify a winning content item from among the bid-eligible content items;

providing, by one or more processors, the winning content item responsive to the request; and updating, by one or more processors, an eligibility status for each of losing content items and the winning content item in the auction, wherein updating the eligibility status includes updating either a count associated with prior losses in auctions or an eligibility status associated with each losing content item.

2. The method of claim 1 wherein the eligibility status is based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item.

3. The method of claim 1 wherein the eligibility status is based on a rate of success in auctions for a respective content item or sponsor associated with a respective content item, and wherein updating includes updating a rate for a respective losing content item or sponsor associated with a losing content item.

4. The method of claim 1 wherein updating further includes declaring one or more of the losing content items as ineligible for a future auction based on an eligibility function.

5. The method of claim 4 further comprising applying a probability function to determine eligibility for each losing content item and setting eligibility for each individual losing content item based on the applying.

6. The method of claim 1 wherein the eligibility threshold is associated with a predetermined rate of winning auctions.

7. The method of claim 1 further comprising storing eligibility information for each content item in the inventory for each user.

8. The method of claim 1 further comprising storing auction results information in a log including identifying information for losing bids and user identifiers associated with received requests for content related to a given auction.

9. The method of claim 1 further comprising determining which of the losing content items should be declared ineligible for a next opportunity to present content to the user and updating a status associated with a declared ineligible content item.

10. The method of claim 9 wherein determining which of the losing content items should be declared ineligible includes using an eligibility function to declare an individual content item either eligible or ineligible.

11. The method of claim 1 further comprising soliciting a real-time bid from a content sponsor for presentation of a content item responsive to the request and declaring the bid ineligible based at least in part on the eligibility status.

12. The method of claim 1 wherein identifying the user is based on a cookie, a device identifier or a login operation.

13. The method of claim 1 further comprising notifying a content sponsor when a content item is declared ineligible for a future auction.

14. A computer program product embodied in a non-transitive computer-readable medium including instructions, that when executed, cause one or more processors to:

receive a request for content to be displayed on a resource to a user;

identify the user;

identify candidate content items from an inventory of content items that are responsive to the request;

evaluate the candidate content items including determining bid-eligible content items including content items that satisfy an eligibility threshold based on an eligibility status associated with a respective candidate content item, the eligibility status based at least in part on results associated with one or more past opportunities to present a content item to the identified user;

conduct an auction to identify a winning content item from among the bid-eligible content items;

provide the winning content item responsive to the request; and update an eligibility status for each of losing content items and the winning content item in the auction, wherein updating the eligibility status includes updating either a count associated with prior losses in auctions or an eligibility status associated with each losing content item.

15. The computer program product of claim 14 wherein the eligibility status is based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item.

16. The computer program product of claim 14 wherein the eligibility status is based on a rate of success in auctions for a respective content item or sponsor associated with a respective content item, and wherein updating includes updating a rate for a respective losing content item or sponsor.

17. A system comprising:

one or more processors; and one or more memory elements including instructions that, when executed, cause the one or more processors to:

receive a request for content to be displayed on a resource to a user;

identify the user;

identify candidate content items from an inventory of content items that are responsive to the request;

evaluate the candidate content items including determining bid-eligible content items including content items that satisfy an eligibility threshold based on an eligibility status associated with a respective candidate content item, the eligibility status based at least in part on results associated with one or more past opportunities to present a content item to the identified user, wherein the respective candidate content item is identified as being ineligible if the respective candidate content item has lost too many recent bids in opportunities to present content to the user;

conduct an auction to identify a winning content item from among the bid-eligible content items;

provide the winning content item responsive to the request; and update an eligibility status for each of losing content items and the winning content item in the auction, wherein updating the eligibility status includes updating either a count associated with prior losses in auctions or an eligibility status associated with each losing content item.

18. The system of claim 17 wherein the eligibility status is based on a previous number of prior losses in auctions in which a specific content item participated or any content items from an associated content sponsor participated, wherein evaluating includes evaluating a respective count in comparison to the eligibility threshold, and wherein updating the eligibility status includes updating the count for a respective losing content item.

19. The system of claim 17 wherein the eligibility status is based on a rate of success in auctions for a respective content item or sponsor associated with a respective content item, and wherein updating includes updating a rate for a respective losing content item or sponsor.

* * * * *